United States Patent [19]
DeYoreo

[11] 4,158,268
[45] Jun. 19, 1979

[54] ELECTRICAL GRILL ASSEMBLY AND ASSOCIATED INSULATOR SPACER

[75] Inventor: Sal G. DeYoreo, Andover, Mass.

[73] Assignee: Automatic Radio Mfg. Co., Inc., Melrose, Mass.

[21] Appl. No.: 826,040

[22] Filed: Aug. 19, 1977

[51] Int. Cl.² .............................................. A01M 1/22
[52] U.S. Cl. ................................... 43/112; 174/138 R
[58] Field of Search ............... 43/112, 98; 174/138 R; 336/207; 338/304, 321

[56] References Cited

U.S. PATENT DOCUMENTS

| | | | |
|---|---|---|---|
| 2,092,136 | 9/1937 | Plym et al. | 43/112 |
| 2,986,716 | 5/1961 | Carlon | 336/207 X |
| 3,319,374 | 5/1967 | Gawne | 43/112 |

Primary Examiner—Robert C. Watson
Attorney, Agent, or Firm—Thompson, Birch, Gauthier & Samuels

[57] ABSTRACT

An electrical grill assembly for use in a device for electrically exterminating insects, comprising inner and outer generally cylindrical metal grill members which are held in a coaxial mutually spaced relationship by insulator spacers interposed therebetween. The insulator spacers are structurally interlocked with the grill members at least partially by means of oppositely extending protrusions which are integrally formed on the spacers and which are received in radially aligned openings in opposed portions of the grill members.

3 Claims, 4 Drawing Figures

ELECTRICAL GRILL ASSEMBLY AND ASSOCIATED INSULATOR SPACER

FIELD OF THE INVENTION

This invention relates generally to devices for electrically exterminating insects, and is concerned in particular with electrical grill assemblies and associated insulator spacers employed in such devices.

BACKGROUND OF THE INVENTION

Devices for electrically exterminating insects are now well known in the art as evidenced for example by the devices disclosed in U.S. Pat. Nos. 3,835,577 and 3,823,506. In these known devices, the electrical grill or grid assemblies include inner and outer metal conductors spaced by insulators interposed therebetween. The conductors are attached to the insulators by means of metal fasteners, for example screws, rivets or the like. This arrangement presents several problems. First, the dimension of the gap between the tips of the fasteners is critical and must be kept large enough to insure needed insulating properties. In order to establish this gap, the insulators must be made thicker than the desired gap between the conductors, and this in turn results in higher costs because insulating material is relatively expensive. Also, the task of attaching such fasteners is time consuming, thereby further adding to the overall cost of the unit. U.S. Pat. No. 3,758,980 shows still another example of an electrical grid assembly having similar problems associated therewith.

A general object of the present invention is the provision of an improved electrical grill assembly which avoids the above-mentioned problems.

A more specific object of the present invention is the elimination of screws, rivets and other like metal fasteners conventionally employed to attach metal conductor members to insulator spacers interposed therebetween.

Another object of the present invention is the provision of an improved grill assembly which is less expensive to manufacture, and which exhibits improved insulating characteristics.

A still further object of the present invention is the provision of a grill assembly having improved means for structurally interlocking the grill members to insulator spacers interposed therebetween, without employing metal fasteners such as screws, rivets or the like.

SUMMARY OF THE INVENTION

According to the present invention, there is provided an electrical grill assembly having inner and outer substantially cylindrical metal grill members held in radially spaced relationship by insulator spacers interposed therebetween. The insulator spacers have integrally formed protrusions which are received in radially aligned openings in the grill members.

Preferably, the inner and outer grill members each include longitudinally extending circumferentially spaced ribs which are joined to axially spaced circular bands, with the circular bands of the inner grill member being of a lesser diameter than the circular bands of the outer grill member to thus provide an annular space therebetween.

The above-mentioned radially aligned openings are preferably located in the aforesaid circular bands, the latter being received in grooves in oppositely disposed side faces of at least some of the insulator spacers. The integrally formed protrusions on the insulator spacers extend from the bases of these grooves into the radially aligned openings.

Preferably, the width of the insulator spacers as defined by the distance between the grooved side faces is greater than the radial dimension of the annular space between the circular bands of the grill assembly. With this arrangement, the circular bands of the grill members snap into the grooves of the insulator spacers as the integral protrusions thereon are received in the aforesaid radially aligned openings. This provides a structurally interlocked relationship between the grill members and the insulator spacers without having to resort to additional metal fasteners such as screws, rivets or the like.

The invention also encompasses the insulator spacer, which preferably comprises an integrally formed body having a planar web at least partially surrounded by oppositely disposed side faces and an end face. Grooves in the side faces are adapted to receive the radially arranged circular bands of the inner and outer grill members. The planar web preferably at least partially surrounds a cylindrical boss extending axially from the aforesaid end face in a direction parallel to the side faces. An opening leads from the end face into the interior of the boss to receive an attachment screw, rivet or the like used to fix the grill assembly to other components of the device.

Preferably, the bottom of the opening in the boss is closed and located laterally with respect to the web area lying between the grooves in the side faces of the insulator.

DETAILED DESCRIPTION OF PREFERRED EMBODIMENT

Figure 1:
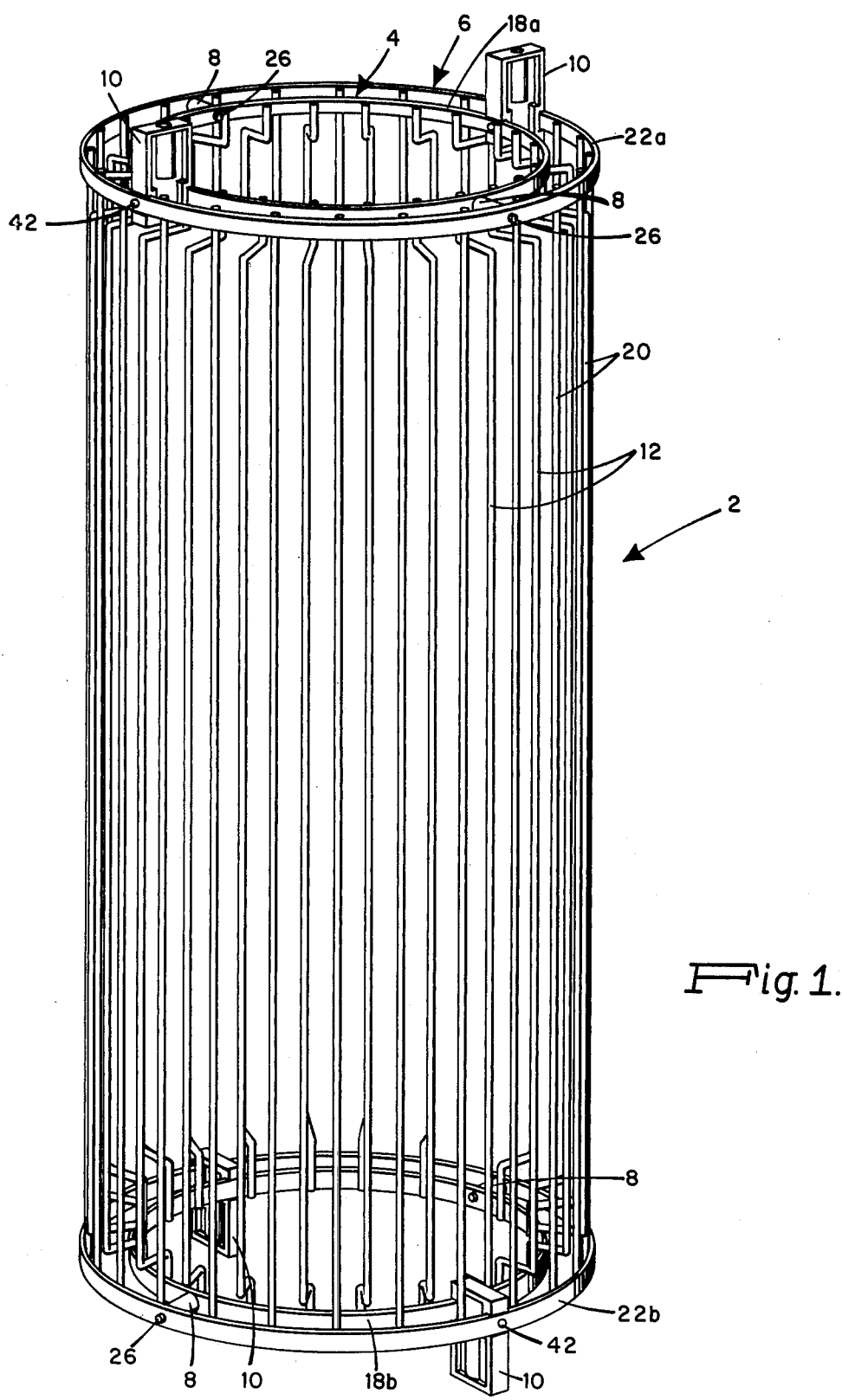
FIG. 1 is a view in perspective of a preferred embodiment of a grill assembly embodying the concepts of the present invention.

Referring now to the drawings, there is shown at 2 a preferred embodiment of an electrical grill assembly for use in an apparatus for electrically exterminating insects. The assembly 2 includes an inner grill member 4, an outer grill member 6, and a plurality of non-metallic insulator spacers 8, 10 interposed therebetween. The insulator spacers may be molded from any known insulating material, for example Teflon.

Figure 4:
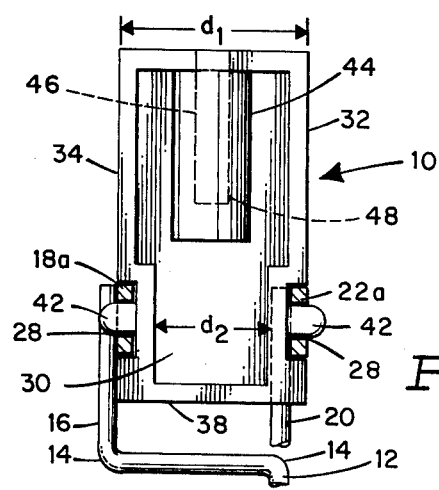

The inner grill member 4 is generally cylindrical in shape, having circumferentially spaced ribs indicated typically at 12 which are suitably bent as at 14 (see FIG. 4) to form inwardly disposed ends 16 which are joined as by welding to axially spaced circular bands 18a, 18b.

The outer grill member 6 is similarly provided with longitudinally extending ribs indicated typically at 20. The ribs 20 are also joined as by welding to axially spaced bands 22a, 22b. The circular bands 18a, 18b of the inner grill member 4 are of a lesser diameter than the circular bands 22a, 22b of the outer grill member 6. Thus, there exists an annular space 24 between the bands 18a, 22a and 18b, 22b.

The non-metallic insulator spacers 8, 10 are arranged at circumferentially spaced locations around the annular spaces 24 between the bands of the inner and outer grill members. The spacers 8 have generally cylindrical bodies with integrally formed protrusions 26 extending axially from the ends thereof into radially aligned openings 28 in the bands 18a, 22a, and 18b, 22b of the grill members.

The spacers 10 are preferably integrally formed as by injection molding, each including a planar web 30 at least partially surrounded by oppositely disposed side faces 32, 34 and an end face 36. An oppositely disposed second end face 38 may also be provided. Grooves 40 in the side faces 32, 34 are adapted to receive the radially arranged circular bands 18a, 22a and 18b, 22b of the inner and outer grill members. Integral protrusions 42 extend from the bases of the grooves 40 into additional radially aligned openings 28 in the circular bands.

Figure 2:
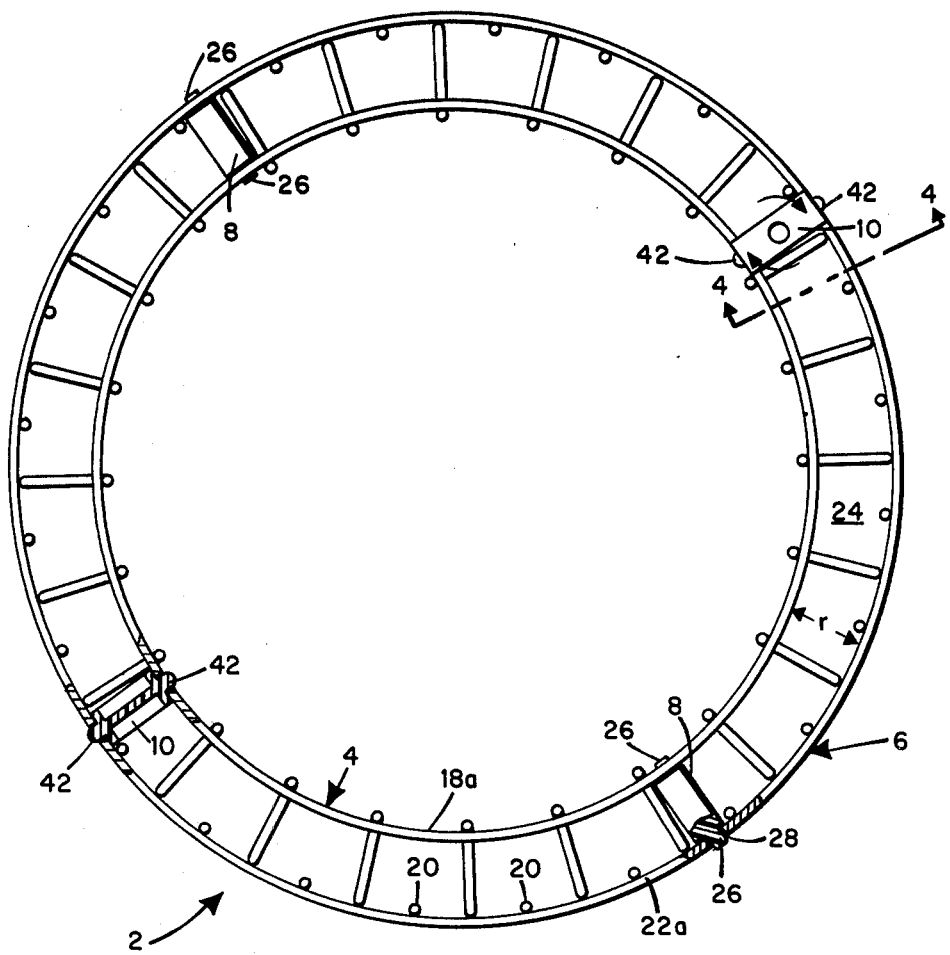
FIG. 2 is a plan view of FIG. 1 with portions shown in section.
Figure 3:
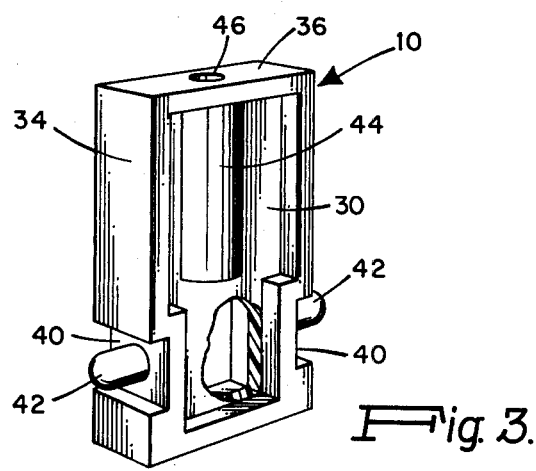
FIG. 3 is a perspective view, partially broken away, of an insulator spacer in accordance with the present invention; and, FIG. 4 is a sectional view taken through lines 4—4 of FIG. 2.

Preferably, the distance "$d_1$" between the grooved side faces 32, 34 of the spacers 10 is greater than the radial dimension "r" of the annular space 24 between the bands 18a, 22a and 18b, 22b. Thus, when the spacers 10 are located in a space 24 and then rotated as schematically depicted in FIG. 2, the circular bands (for example 18a, 22a) will be received in the grooves 40 as the protrusions 42 snap into the radially aligned openings 28. This produces a structurally interlocked arrangement without any necessity for resorting to additional metal fasteners such as screws, rivets and the like. Moreover, since the area of web 30 located between each set of bands is not penetrated by metal fasteners, the distance "$d_2$" between the bases of the grooves can be kept to a minimum, with the governing consideration being the provision of proper insulating characteristics.

Preferably the planar web 30 at least partially surrounds a cylindrical boss 44 extending axially from the end face 36 in a direction parallel to the side faces 32, 34. An opening 46 leads through the end face 36 into the boss 44 where it terminates at a closed bottom 48. The opening 46 is adapted to receive a screw or other like fastener (not shown) which may be used to secure the grill assembly 2 in place between axially spaced structural elements. The bottom 48 of opening 46 is located laterally with respect to the web area lying between the grooves 40, again to avoid disruption of insulating properties.

It is my intention to cover all changes and modifications to the embodiment herein chosen for purposes of disclosure which do not depart from the spirit and scope of the invention.

I claim:

1. An electrical grill assembly for use in an apparatus for electrically exterminating insects, comprising: inner and outer generally cylindrical metal grill members, each grill member having longitudinally extending circumferentially spaced ribs which are joined to axially spaced circular bands, the circular bands of said inner grill member being of lesser diameter than the circular bands of said outer grill member to thus provide annular spaces therebetween, and, a plurality of non-metallic insulator spacers interposed between said inner and outer grill members at circumferentially spaced locations, the circular bands of said inner and outer grill members being received in grooves in oppositely disposed side faces on said insulator spacers, said insulator spacers having protrusions extending from the bases of said grooves into radially aligned openings in the circular bands of said inner and outer grill members.

2. The grill assembly of claim 1 wherein the distance between the grooved side faces of said insulator spacers is greater than the radial dimension of the annular space between radially arranged bands of said inner and outer grill members.

3. The grill assembly of claim 2 wherein said grooved side faces are joined by an end face overlying a cylindrical boss which is joined to said side and end faces by a planar web, with an opening leading through said end face into the interior of said boss.

* * * * *